United States Patent
Konwinski et al.

[11] Patent Number: 6,024,515
[45] Date of Patent: Feb. 15, 2000

[54] LIVE SERVICE PIPE INSERTION APPARATUS AND METHOD

[75] Inventors: Greg Konwinski; Robert Barrett; Charles Re; Randall Doctor; Frank Poskocil; John Fred; Anthony Pietramale, all of Naperville, Ill.

[73] Assignee: Nicor Technologies Inc., Naperville, Ill.

[21] Appl. No.: 08/811,521

[22] Filed: Mar. 4, 1997

Related U.S. Application Data

[60] Provisional application No. 60/012,789, Mar. 4, 1996.

[51] Int. Cl.$^7$ .................................. E02F 5/10; F16L 55/16
[52] U.S. Cl. ..................... 405/184; 1405/154; 1405/156; 138/97; 138/98; 156/294; 264/269
[58] Field of Search .................................. 405/154, 156, 405/184; 138/97, 98, 89; 156/289, 293, 294, 297; 264/269, 36.16, 516

[56] References Cited

U.S. PATENT DOCUMENTS

| | | |
|---|---|---|
| 1,471,184 | 10/1923 | Miles . |
| 2,377,615 | 6/1945 | Crane ........................................ 264/269 |
| 2,522,171 | 9/1950 | Furman et al. . |
| 2,731,041 | 1/1956 | Mueller et al. . |
| 2,756,779 | 7/1956 | Tratzik et al. . |
| 2,829,675 | 4/1958 | Mueller et al. . |
| 3,294,121 | 12/1966 | Powell et al. . |
| 3,568,721 | 3/1971 | Ross ............................................ 138/97 |
| 3,626,576 | 12/1971 | Ray . |
| 3,762,446 | 10/1973 | Tungseth et al. . |
| 3,821,965 | 7/1974 | Reynolds . |
| 3,845,789 | 11/1974 | Rohrer . |
| 3,905,388 | 9/1975 | Chiarelli . |
| 4,009,732 | 3/1977 | Martin et al. . |
| 4,090,534 | 5/1978 | Martin et al. . |
| 4,321,740 | 3/1982 | Davis et al. . |
| 4,331,170 | 5/1982 | Wendell . |
| 4,377,945 | 3/1983 | Di Giovanni et al. . |
| 4,390,042 | 6/1983 | Kucherer et al. . |
| 4,394,202 | 7/1983 | Thomas et al. . |
| 4,399,829 | 8/1983 | Schuler . |
| 4,431,017 | 2/1984 | Willemsen . |
| 4,434,816 | 3/1984 | Di Giovanni et al. . |
| 4,437,494 | 3/1984 | Soper et al. . |
| 4,456,401 | 6/1984 | Williams ................................. 138/97 X |
| 4,497,332 | 2/1985 | Sewell et al. . |
| 4,573,628 | 3/1986 | Dohlen et al. . |
| 4,702,787 | 10/1987 | Ruskin et al. ........................... 156/244 |
| 4,713,870 | 12/1987 | Szalvay . |
| 4,719,936 | 1/1988 | Tsubakimoto et al. . |
| 4,730,636 | 3/1988 | Volgstadt et al. . |
| 4,762,674 | 8/1988 | Cheng et al. ........................... 376/405 |

(List continued on next page.)

FOREIGN PATENT DOCUMENTS

| | | |
|---|---|---|
| 1162063 | 2/1984 | Canada . |
| 0506142 | 9/1992 | European Pat. Off. . |
| 0578270 | 1/1994 | European Pat. Off. . |
| 1273388 | 9/1961 | France . |
| 1342949 | 10/1963 | France . |
| 8000961 | 12/1980 | France . |
| 3145284 | 5/1983 | Germany . |
| 3722622 | 10/1988 | Germany . |
| 0536228 | 11/1955 | Italy . |
| 56-42556 | 5/1981 | Japan . |
| 60-188691 | 9/1985 | Japan . |
| 0650082 | 2/1951 | United Kingdom . |
| 0914647 | 1/1963 | United Kingdom . |
| 1551855 | 9/1979 | United Kingdom . |
| 1594937 | 8/1981 | United Kingdom . |
| 1604255 | 12/1981 | United Kingdom . |
| 2103753 | 2/1983 | United Kingdom . |
| 0406377 | 9/1994 | United Kingdom . |
| 2299645 | 10/1996 | United Kingdom ................... 405/156 |
| 9007672 | 7/1990 | WIPO . |

*Primary Examiner*—David Bagnell
*Assistant Examiner*—Jong-Suk Lee
*Attorney, Agent, or Firm*—Dvorak & Orum

[57] ABSTRACT

An apparatus and method for inserting a new service pipe into an existing service pipe without the necessity of excavation or separately shutting off the supply of gas upstream of the effected pipe section comprises of a nosecone allowing a flow of sealer to travel back through an annular space between the new pipe and the old pipe, providing a gas tight permanent seal.

6 Claims, 2 Drawing Sheets

U.S. PATENT DOCUMENTS

| | | |
|---|---|---|
| 4,832,069 | 5/1989 | Gale et al. . |
| 4,869,281 | 9/1989 | Rockower et al. . |
| 4,978,255 | 12/1990 | Gale et al. . |
| 4,993,875 | 2/1991 | Nicholson, Sr. et al. . |
| 5,030,039 | 7/1991 | Dove . |
| 5,048,793 | 9/1991 | Mefford et al. . |
| 5,052,431 | 10/1991 | Jiles . |
| 5,062,207 | 11/1991 | Martin et al. . |
| 5,063,967 | 11/1991 | Stephens ................................... 138/98 |
| 5,099,868 | 3/1992 | Weber . |
| 5,105,844 | 4/1992 | King, Sr. . |
| 5,152,310 | 10/1992 | O'Bryon . |
| 5,170,813 | 12/1992 | Francis . |
| 5,205,706 | 4/1993 | Belcher ................................... 415/105 |
| 5,241,993 | 9/1993 | Stephens ................................... 138/98 |
| 5,282,494 | 2/1994 | Elgar et al. . |
| 5,287,893 | 2/1994 | Elgar et al. . |
| 5,327,923 | 7/1994 | Eischen et al. . |
| 5,345,971 | 9/1994 | Elgar et al. . |
| 5,385,431 | 1/1995 | Topf, Jr. . |
| 5,400,492 | 3/1995 | Hodgson et al. . |
| 5,497,807 | 3/1996 | Rogers . |
| 5,657,117 | 8/1997 | Wood et al. ........................ 138/97 X |
| 5,845,668 | 12/1998 | Taylor et al. ........................ 138/97 X |

LIVE SERVICE PIPE INSERTION APPARATUS AND METHOD

This application claims the benefit of U.S. Provisional Application No. 60/012,789 filed Mar. 4, 1996.

BACKGROUND OF THE INVENTION

1. Field of the Invention

The present invention relates to the replacement and repair of fluid supply service pipes, in particular, the invention relates to the insertion of a replacement pipe into an existing, live gas service pipe, without the necessity of excavation. The invention is also related to the testing and sealing of the newly established pipe before the new pipe is put into service.

2. Description of Related Art

In the past, replacement of underground fluid service pipes, particularly gas service pipes, involved excavation of areas adjacent the affected pipe, and temporary termination of the flow of gas at a point upstream of the interface of the new pipe with the old pipe. Improvements in this technique have been proposed, whereby the new pipe is inserted into the old pipe, without the need for excavation. However, the prior art fails to solve problems associated with internal sealing of the pipe, testing procedures, and seal removal. In particular, prior art systems fail to adequately address the problem of ensuring that a permanent fluid tight seal is effected between the ends of the newly installed pipe and the volume between the new pipe and the old pipe. Blind methods, where sealant is installed without the ability to visually confirm complete filling of the void between old and new pipes, suffer from the possibility of gaps in the sealant which would provide a path for gas to travel from a point at the interface of the old pipe and the terminal ends of the new pipe into the void between the old and new pipes, resulting in a failure of the repair of the old pipe. Air entrapment also leads to gaps in the sealant. Prior art systems also fail to adequately address the need for pressure testing of the repaired section before that section is placed into service, as dictated by DOT §49 part 192 and other guidelines. Prior art systems also suffer from the possibility of unwanted movement of the ruptured or discarded temporary plug, because the plug is not completely controlled after it has been removed from its original position during the temporary sealing stage. This may result in movement of the discarded plug into the new flow path of the fluid, partially or completely blocking the flow of fluid. Also, prior art systems have failed to provide for economical and reliable elements which may be utilized in a cost efficient manner, thereby reducing the practical benefit over traditional methods of pipe replacement.

These and other problems are addressed and solved by the present invention.

SUMMARY OF THE INVENTION

The present invention involves a pipe repair system whereby a new pipe is inserted into an old pipe from a fluid destination point, such as a receiving point of a natural gas service line. Contiguous with the new pipe are a nosecone assembly and a sealant insertion tube. In one embodiment, the new pipe/sealant tube/nosecone assembly is inserted into an existing live old pipe, beginning from the gas receiving point, such as the area of a gas meter. The assembly is inserted through the old pipe to a point upstream of a known leaking area. In some cases the insertion may extend the entire length of the old gas service pipe, from the meter to the gas supply main. However, the invention is not limited to this application, as it is ready apparent that the invention may be applied to virtually any situation involving a leaking section of fluid pipe, or other fluid pipe needing replacement.

The nosecone effects a temporary seal, by ensuring that the fluid is always maintained upstream of the nosecone and new pipe during and after the movement into the old pipe. The assembly may be inserted at least to a point upstream of the leaking section of old pipe. Sealant is next introduced into the sealant tube, to the nosecone. The nosecone includes sealant exit points which allow the sealant to change direction and travel back the entire length of the inserted pipe through the annular space between the old pipe and the new pipe. Sealant exit points near the sealant entry point allow visual observation and confirmation of complete annular space sealing by the sealant. Pressure testing of the new pipe is possible at this stage. It may also be noted that the air test may be performed before the sealing step has been undertaken. Thereafter, the sealant tube and the nosecone plug are completely withdrawn from the new pipe, allowing the free flow of fluid through the new pipe.

Visual observation of returning sealant ensures that a permanent fluid tight seal has been effected along the entire length of the new pipe.

Pressure testing ensures that the pipe replacement procedure has been successfully performed.

Complete removal of the sealant tube and nosecone plug ensures that obstruction of the new fluid path will not occur.

The consistent and verifiable procedure reduces the need for skilled human judgment during the replacement process, thereby ensuring predictable costs and safe, reliable results.

These and other objects are satisfied by the invention set out more fully below.

DETAILED DESCRIPTION OF THE INVENTION

Figure 1:
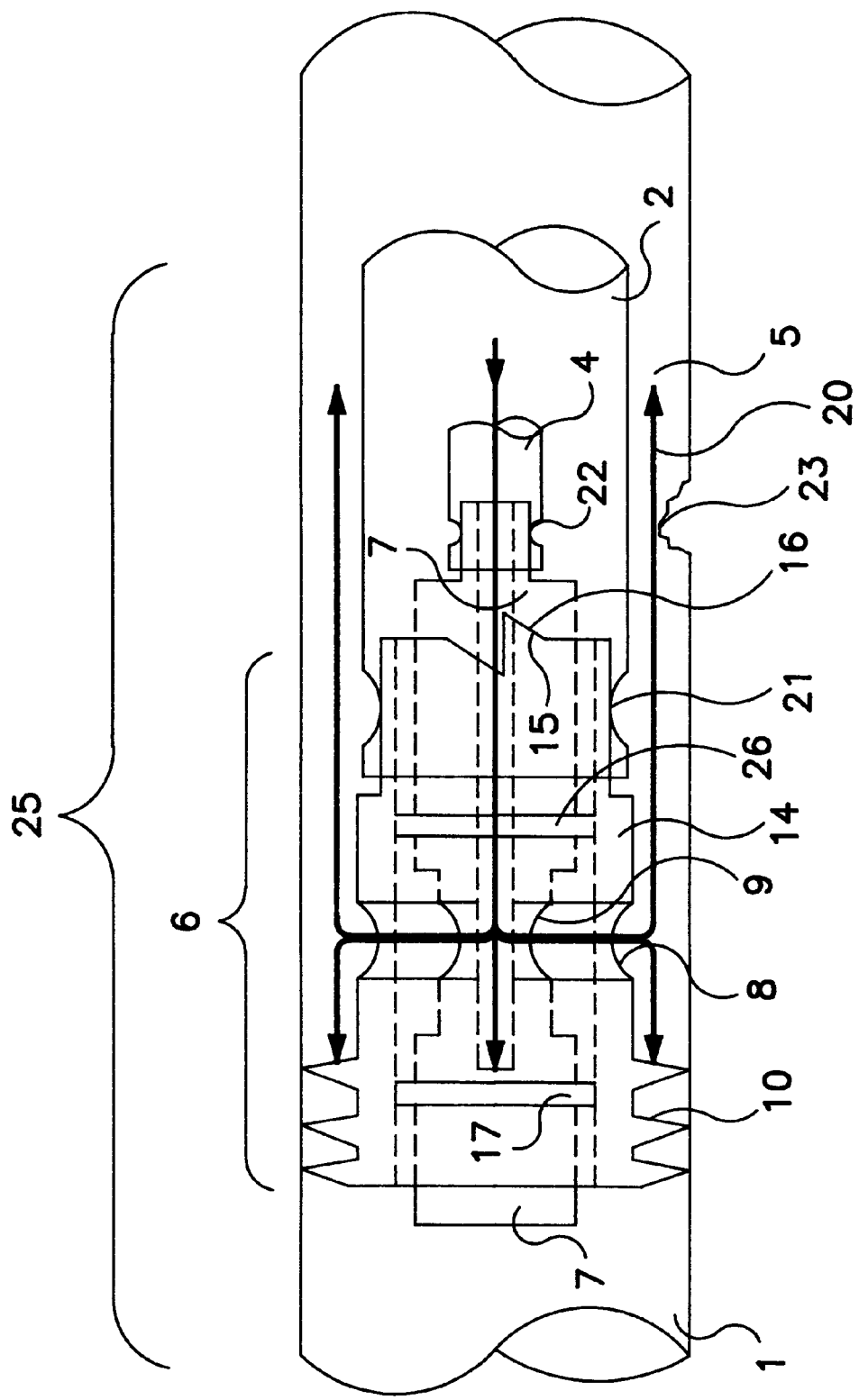
FIG. 1 is a partial cutaway view of the nosecone assembly.

FIG. 1 shows the nosecone 6 of the present invention, after insertion into an old pipe 1 having a rupture 23. It is to be noted that in the case of buried pipes, the volume around the rupture is limited by the surrounding earth. Nosecone 6 has a hollow nosecone housing 14. A removable plug 7 fits within the hollow space of the nosecone housing 14. A new pipe 2 is attached to the nosecone housing 14, and may be sealed at new pipe seal point 21. The seal may comprise a fusion seal, a compression seal, a circumferential clamp, or other means. A sealant tube 4 is attached to the removable plug 7, and may be sealed at sealer tube seal point 22. Nosecone seals 10 are located near a distal end of nosecone housing 14. Nosecone seals 10 may be in the form of fins, O-rings, flexible gaskets or other fluid impervious material. Nosecone housing 14 may have a nosecone housing alignment lock 15 mateable with a removable plug alignment lock 16. A sealant path 20 extends through the interior of sealant tube 4, through an interior blind lore of the removable plug 7, through removable plug sealant exit points 9, through nosecone sealant exit points 8, and into an annular space 5 existing between the outer surface of the new pipe and the inner surface of the old pipe. Removable plug seals 17 and 26 may be positioned at points fore and aft of the nosecone sealant exit points 8 and removable plug sealant exit points 9.

Figure 2:
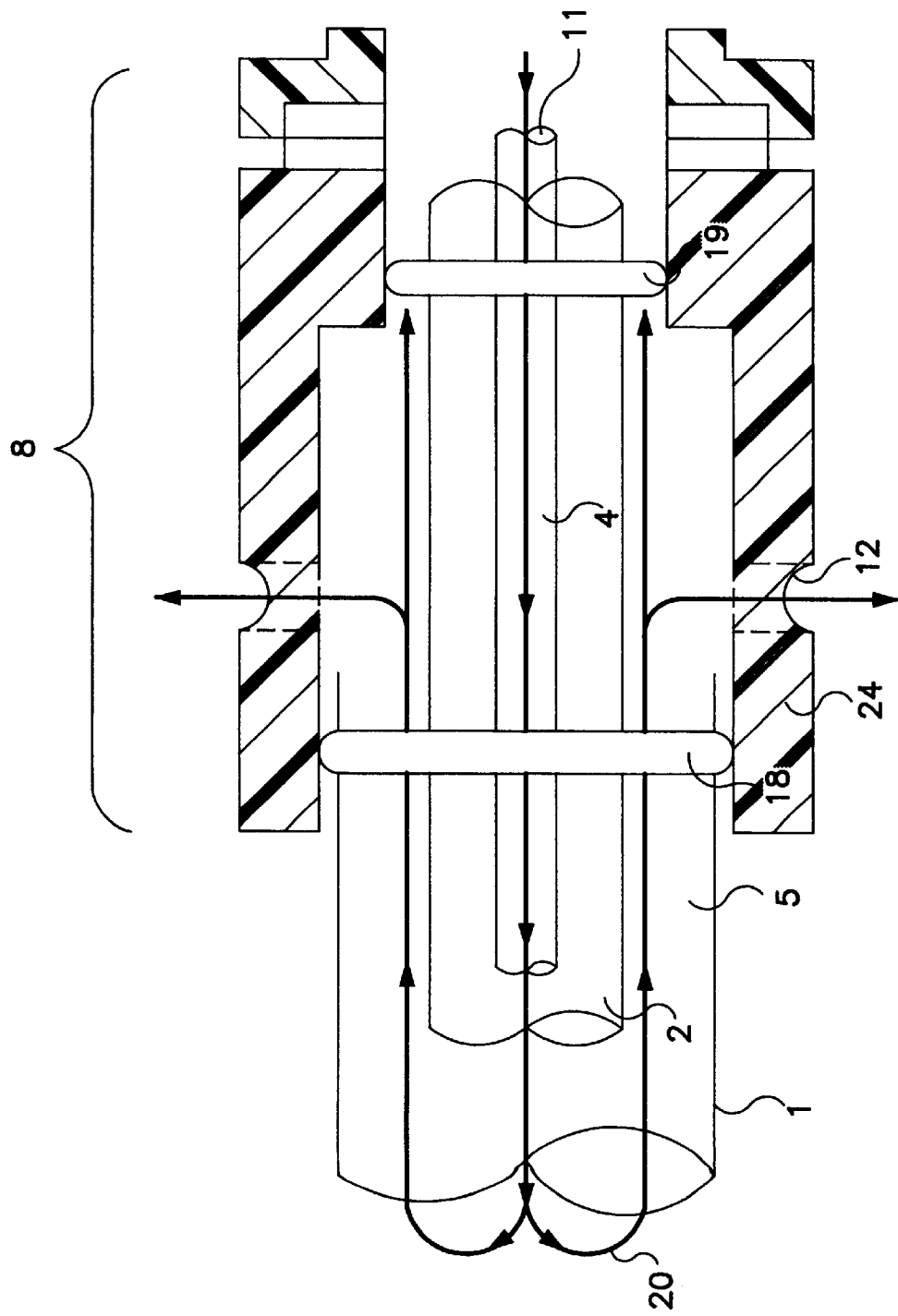
FIG. 2 is a partial cutaway view of the service head adapter.

FIG. 2 shows the service head adapter 3 which may ultimately be connected with piping leading to a fluid or gas consumer. The service head adapter 3 may have sealant exit points 12 which may provide a path for the escape of air and other gases, and sealant previously contained within the annular space 5. Also shown is sealant entrance point 11 which allows introduction of sealant to the interior of sealant tube 4. Service head adapter seal 18, which may be in the form of an O-ring, threads, or other means, provides a fluid tight seal between the old pipe 1 and the service head adapter body 24.

A new pipe sealant seal 19 forms a fluid tight seal between the new pipe 2 and the service head adapter body 24.

In operation, the entire pipe renewal apparatus 25 may be inserted into an old pipe 1 containing fluid above, at, or below atmospheric pressure, using pipe renewal apparatus insertion means. In one embodiment, the pipe renewal apparatus 25 is inserted at an end of an old pipe 1 distal from a fluid supply point, such as a gas main. The pipe renewal apparatus 25 may pass through a service head adapter 3 which serves to interface with equipment downstream of the distal end of the new pipe 2, such as a gas meter or other gas consumers.

As the pipe renewal apparatus 25 is inserted into the old pipe 1, the nosecone seals 10 serve to prevent the flow of fluid from points upstream. In the case of repair of a rupture 23, the pipe renewal apparatus 25 is inserted at least until the nosecone seal 10 has reached a point upstream from the rupture 23. In order to create a permanent fluid tight seal, sealant is introduced through sealant entry point 11 into the sealant tube 4. The sealant travels along sealant path 20 in a direction away from the sealant entry point 11, passing along the entire length of the new pipe 2. The sealant travels through an interior bore of the removable plug 7, into the nosecone 6. The removable plug sealant exit points 9 are placed in and remain in fluid connection with the nosecone sealant exit points 8 as a result of the mating of the nosecone housing alignment lock 15 with the removable plug alignment lock 16. This fluid connection allows the sealant to travel from the interior bore of the removable plug 7, through the removable plug sealant exit points 9, through the nosecone sealant exit points 8, and out into the annular space 5 formed between the interior of the old pipe 1 and the exterior of the new pipe 2.

Sealant travel beyond the distal end of the nosecone 6 is prevented by the nosecone seals 10. Also, sealant movement fore and aft of the nosecone sealant exit point 8 is prevented by the removable plug seals 17. The sealant is urged to reverse direction, and travel back towards the sealant entry point 11 along the annular space 5. In so doing, the sealant forces any material, in particular air and other gases, ahead of it in its journey back towards the sealant entry point 11. The annular space 5 is consequently positively and substantially filled with sealant, without the danger of significant air gaps or pockets. The sealant continues its movement, under pressure, until it reaches the service head adapter 3, at which time its movement is arrested by the new pipe sealant seal 19, and also by the service head adapter seal 18. The sealant then follows the path of least resistance out through the sealant exit points, urging the trapped material, particularly air and other gases, out ahead of it. The operator of the invention has the opportunity to view the exit of the trapped material and sealant, thereby verifying that the sealing of the annular space 5 has been completed.

Depending on the sealant utilized, some time period may be allowed for the sealant to set and reach a state which ensures a proper seal. In the case of a grout type sealant, this may take several minutes. After the sealant has set, a pressure test may be applied to the new pipe 2. As earlier stated, however, the pressure test may also be performed before sealing is undertaken. In effect, the entire pipe renewal apparatus may be tested to ensure that all pressurized interfaces existing between the new pipe 2, service head 3 and the nosecone housing 14 remain intact. After pressure testing, if performed, the sealant tube 4 and the removable plug 7 may be entirely withdrawn from the interior of the nosecone 6 and the new pipe 2. The sealant tube 4 and the removable plug 7 may be removed through the service head adapter 3. Valve means near the service head adapter 3 prevents the uncontrolled flow of fluid beyond the service head adapter 3 until necessary fluid connections are completed downstream from the valve means.

In one embodiment, a triple seal exists between the fluid supply point upstream of the pipe renewal apparatus 25 and the service head adapter 3; the nosecone seal 10, the sealant in the annular space 5, and the service head adapter seal 18. Likewise, a double seal exists between the fluid supply point upstream of the pipe renewal apparatus 25 and the rupture 23; the nosecone seal 10 and the sealant in the annular space 5.

Also, sealant movement fore and aft of the nosecone sealant exit point 8 is prevented by the removable plug seals 17.

The scope of the invention encompasses all equivalent structure and methods and shall only be limited by the following claims.

What is claimed is:

1. An apparatus for renewing and sealing a leaking section of an existing pipeline with a replacement pipeline, said existing pipeline having a fluid flowing therethrough, said apparatus comprising:

a generally cylindrical hollow nosecone housing for insertion into said existing pipeline, said housing defined by a circumferential longitudinal wall having a wall thickness, a first end having an end face, and a second end having an end face, and an interior space extending between said ends, said first end having an external circumferential sealing means thereabout for terminating said flow of fluid within said existing pipeline, said second end having a locking means formed thereabout and said end face of said second end including means for receiving thereon an end of said replacement pipeline, said nosecone housing wall including a plurality of radially oriented holes disposed near said first end, said holes communicating said hollow interior space with said annular space;

a generally cylindrical plug removably insertable into said interior space of said nosecone housing, said plug having an exterior surface and a configuration for fluidly sealing said first end of said nosecone housing when inserted therein and for conveying therethrough, a sealant material to said interior space of said nosecone housing, said plug having a first and a second end and corresponding first and second end faces, a blind bore extending from said second end towards said first end, and a plurality of radially directed holes located near a termination of said blind bore, said radial holes extending between said blind bore and said exterior surface of said plug and in communication with said interior space of said nosecone housing, said radial holes corresponding to sealant exit points, said plug including a pair of longitudinally spaced seals surrounding said plug exterior for forming a fluid-impervious seal between said plug and said nosecone housing when said plug is inserted into said housing, said seals disposed fore and aft of said sealant exit points, said second end including plug locking means formed about said exterior surface, said plug locking means complementarily matable with said locking means of said nosecone housing when said plug is inserted within said interior space of said nosecone housing, said end face of said second end including means projecting therefrom for connection to a sealant supply tube;

said sealant supply tube for supplying flowable sealant material to said removable plug, said sealant tube concentrically arranged within said replacement pipeline, wherein said sealant material is pumped through said tube and into said blind bore of said removable plug so as to exit said exit points of said plug, thereby communicating the sealant material into said interior of said nosecone housing and then through said exit points of said nosecone housing, into said annular space, whereby after said annular space is filled, said removable plug and sealant tube are collectively removed from said replacement piping.

2. The apparatus of claim 1 further including a service head adapter, which said adapter comprises a service head adapter body in communication with the annular space, the service head adapter body having an internal cavity longitudinal of said body and at least two radial holes extending through said body and said body in communication with said internal cavity, said body including an external seal which provides a fluid-tight seal between the existing pipe and the service head adapter body wherein sealant material supplied to said annular space exits said sealant exit point.

3. The service pipe renewal apparatus of claim 2 wherein the plug seals are O-ring seals.

4. The apparatus of claim 1 wherein the locking means of said nosecone housing comprises an alignment lock and said locking means of said removable plug comprises a complementary alignment lock.

5. The apparatus of claim 1 wherein the alignment locking means facilitates alignment of the removable plug sealant exit points with the nosecone housing sealant exit points.

6. The service pipe renewal apparatus of claim 1 wherein the circumferential sealing means includes at least one fin.

* * * * *